(12) United States Patent
Kim et al.

(10) Patent No.: US 8,769,292 B2
(45) Date of Patent: Jul. 1, 2014

(54) METHOD FOR GENERATING STANDARD FILE BASED ON STEGANOGRAPHY TECHNOLOGY AND APPARATUS AND METHOD FOR VALIDATING INTEGRITY OF METADATA IN THE STANDARD FILE

(75) Inventors: Jong-Heum Kim, Seoul (KR); Jong-An Kim, Seoul (KR); Pyong-Hee Han, Seoul (KR)

(73) Assignee: KT Corporation, Gyeonggi-do (KR)

( * ) Notice: Subject to any disclaimer, the term of this patent is extended or adjusted under 35 U.S.C. 154(b) by 1271 days.

(21) Appl. No.: 12/053,471

(22) Filed: Mar. 21, 2008

(65) Prior Publication Data

US 2008/0229099 A1 Sep. 18, 2008

Related U.S. Application Data

(63) Continuation of application No. PCT/KR2006/003781, filed on Sep. 22, 2006.

(30) Foreign Application Priority Data

Sep. 22, 2005 (KR) .................. 10-2005-0088361
Sep. 21, 2006 (KR) .................. 10-2006-0091932

(51) Int. Cl.
*H04L 29/06* (2006.01)
(52) U.S. Cl.
USPC ........................................... 713/176; 726/26
(58) Field of Classification Search
USPC .......... 713/150, 155, 156, 168, 176; 380/255, 380/259, 269, 270; 726/2–10, 16–21, 726/26–33
See application file for complete search history.

(56) References Cited

U.S. PATENT DOCUMENTS

| 6,389,402 | B1 | 5/2002 | Ginter et al. | |
|---|---|---|---|---|
| 6,389,403 | B1 * | 5/2002 | Dorak, Jr. | 705/52 |
| 7,333,616 | B1 * | 2/2008 | Brettle et al. | 380/277 |
| 2002/0002468 | A1 | 1/2002 | Spagna et al. | |
| 2003/0046238 | A1 | 3/2003 | Nonaka et al. | |
| 2003/0126432 | A1 * | 7/2003 | Tonisson | 713/156 |
| 2004/0039926 | A1 * | 2/2004 | Lambert | 713/189 |
| 2004/0220932 | A1 | 11/2004 | Seeger et al. | |
| 2005/0060315 | A1 * | 3/2005 | Sanin | 707/9 |
| 2005/0066172 | A1 * | 3/2005 | Vorbruggen et al. | 713/176 |

(Continued)

FOREIGN PATENT DOCUMENTS

KR 10-2004-0034165 A 4/2004

OTHER PUBLICATIONS

Search Report dated Jan. 15, 2007 in International Application No. PCT/KR2006/003781, which is the parent application of this application.
Office Action Issued on Dec. 31, 2008 in Corresponding Korean Patent Application No. 10-2006-0091932 With Its English Translation in 8 pages.

(Continued)

*Primary Examiner* — Joseph P. Hirl
*Assistant Examiner* — John B King
(74) *Attorney, Agent, or Firm* — IP Legal Services, LLC

(57) ABSTRACT

An apparatus for validating integrity of metadata in a standard file includes: a metadata acquiring unit for acquiring metadata from a protected file; an integrity evidence value acquiring unit for acquiring an integrity evidence value from a file or a database; a secret information extracting unit for extracting secret information of a file data; and a metadata integrity validating unit for checking if the metadata is correct by using the acquired metadata, the acquired integrity evidence value, and the extracted secret information.

9 Claims, 2 Drawing Sheets

(56) References Cited

U.S. PATENT DOCUMENTS

2005/0091157 A1* 4/2005 Suzuki et al. .................. 705/40
2006/0031418 A1* 2/2006 Savage .......................... 709/219
2006/0059212 A1* 3/2006 Carro ............................ 707/205
2007/0214453 A1* 9/2007 Dive-Reclus ................. 717/175

OTHER PUBLICATIONS

Notice of Allowance issued on Jun. 16, 2009 of corresponding Korean Patent Application No. 10-2006-0091932—1 pg.

* cited by examiner

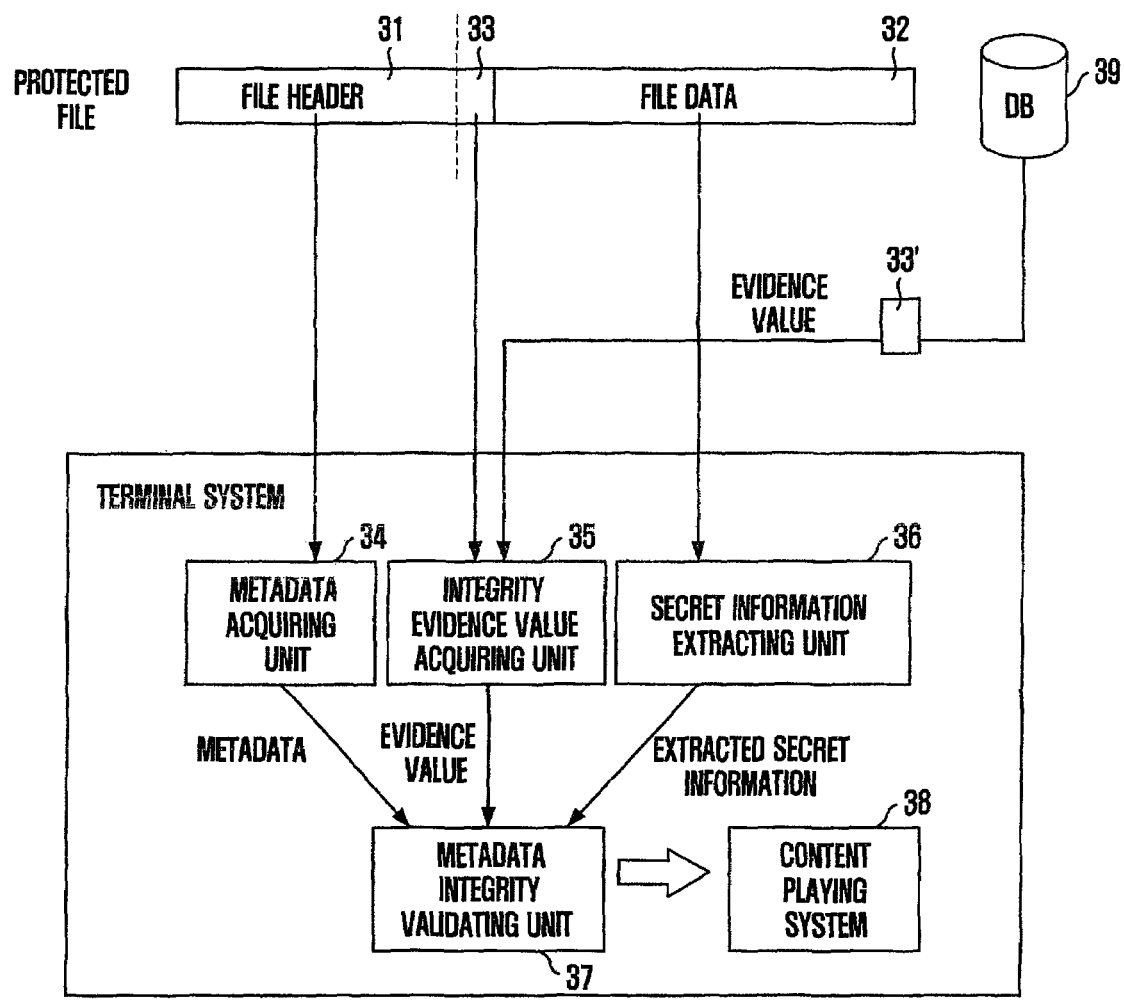

METHOD FOR GENERATING STANDARD FILE BASED ON STEGANOGRAPHY TECHNOLOGY AND APPARATUS AND METHOD FOR VALIDATING INTEGRITY OF METADATA IN THE STANDARD FILE

CROSS-REFERENCE TO RELATED PATENT APPLICATIONS

This application is a continuation application under 35 U.S.C. §365(c) of International Application No. PCT/KR2006/003781, filed Sep. 22, 2006 designating the United States. International Application No. PCT/KR2006/003781 was published in English as WO2007/035062 A1 on Mar. 29, 2007. This application further claims the benefit of the earlier filing dates under 35 U.S.C. §365(b) of Korean Patent Application Nos. 10-2005-0088361 filed Sep. 22, 2005 and 10-2006-0091932 filed Sep. 21, 2006. This application incorporates herein by reference the International Application No. PCT/KR2006/003781 including the International Publication No. WO2007/035062 A1 and the Korean Patent Application Nos. 10-2005-0088361 and 10-2006-0091932 in their entirety.

BACKGROUND

1. Field

The present disclosure relates to a method for generating a standard file, and more particularly, to a method for validating integrity of metadata in the standard file.

2. Discussion of the Related Technology

International/domestic standard groups select parts considered as being necessary for industry activation in the respective fields, and a standard committee consisting of expert groups progresses the standardization. The standardized contents are made in a standard document and are officially published. Therefore, anyone who understands the standard can obtain the file information based on the standard document.

The standardization can attribute to the industry activation by supporting the interface between systems, but it is vulnerable to security attacks. As information technology (IT) industries are advanced, data are increasing and more complicated. For this reason, convenient search and storage are increasingly demanded. Thus, standardization and database of metadata draw attraction. A system requiring a security manages the metadata using a separate security management system.

The foregoing discussion is to provide general background information, and does not constitute an admission of prior art.

SUMMARY

It is, therefore, an aspect of the present invention to provide an apparatus and method for validating integrity of metadata in a standard file using a steganography technology, and a computer-readable recording medium storing a program for realizing the methods. Specifically, the integrity of the metadata inserted into a protected file, the authentication and non-repudiation of a protection subject, and the access control are provided. Thus, the permanent relationship of the metadata inside/outside the file and the service coherence can be obtained and various terminal-based business models can be implemented.

It is another aspect of the present invention to provide a method for generating a standard file and a computer-readable recording medium storing a program for realizing the method. Secret information is inserted into an original file or calculated from file data or contents according to a predetermined formula, and the integrity evidence value of the metadata is generated to thereby create the protected file.

In accordance with one aspect of the present invention, there is provided an apparatus for validating integrity of metadata in a standard file, including: a metadata acquiring unit for acquiring metadata from a protected file; an integrity evidence value acquiring unit for acquiring an integrity evidence value from a file or a database; a secret information extracting unit for extracting secret information of a file data; and a metadata integrity validating unit for checking if the metadata is correct by using the acquired metadata, the acquired integrity evidence value, and the extracted secret information.

In accordance with another aspect of the present invention, there is provided a method for validating integrity of metadata in a standard file, including the steps of: a) acquiring metadata from a protected file when generation and consumption of the protected file are requested, acquiring an integrity evidence value from a file or a database, and extracting secret information of a file data; and b) checking if the metadata is correct by using the acquired metadata, the acquired integrity evidence value, and the extracted secret information.

The method may further include the step of inserting secret information into an original file or calculating secret information from the file data or contents according to a predetermined formula, and generating the integrity evidence value of the metadata, thereby generating the protected file.

In accordance with a further aspect of the present invention, there is provided a method for generating a standard file, including the steps of: a) inserting a previously assigned inherent secret information into file data or contents, or calculating secret information from the file data or contents according to a predetermined formula; and b) inserting the metadata into a file header or optional field; and c) calculating the integrity evidence value of the metadata based on the metadata and the inherent code value or secret information, and inserting the calculated integrity evidence value into the file or separately managing the calculated integrity evidence value in a database of a server.

In accordance with a further aspect of the present invention, there is provided a computer-readable recording medium storing a program for realizing a method for validating integrity of metadata in a standard file, the method including the steps of: a) acquiring metadata from a protected file when generation and consumption of the protected file are requested, acquiring an integrity evidence value from a file or a database, and extracting secret information of a file data; and b) checking if the metadata is correct by using the acquired metadata, the acquired integrity evidence value, and the extracted secret information.

The computer-readable recording medium may further include the step of inserting secret information into an original file or calculating secret information from the file data or contents according to a predetermined formula, and generating the integrity evidence value of the metadata, thereby generating the protected file.

In accordance with a further aspect of the present invention, there is provided a computer-readable recording medium storing a program for realizing a method for generating a standard file, the method including the steps of: a) inserting a previously assigned inherent secret information into a file data or contents, or calculating secret information from the file data or contents according to a predetermined formula; and b) inserting the metadata into a file header or optional field; and c) calculating the integrity evidence value of the metadata based on the metadata and the inherent code value or secret information, and inserting the calculated integrity evidence value into the file or separately managing the calculated integrity evidence value in a database of a server.

In accordance with embodiments of the present invention, the integrity of metadata inserted into an opened file format, authentication and non-repudiation of a subject, and access control can be provided, thereby obtaining the reliability of the metadata inserted into a file. The permanent relationship of the metadata existing inside/outside the file can be obtained and the service coherence can be maintained, thereby obtaining high service security.

Because the reliability of the metadata in the opened file format can be obtained, the vulnerability in the standard such as DRM file format having the important service metadata can be overcome.

Moreover, because the metadata is reliable, a server initiative service using the metadata stored in a database of a server and a terminal initiative service model using metadata of a file can be provided. Therefore, various transaction models between terminals can be surely supported.

BRIEF DESCRIPTION OF THE DRAWINGS

The above and other aspects and features of the present invention will become apparent from the following description of the preferred embodiments given in conjunction with the accompanying drawings, in which:

FIG. 3 illustrates an apparatus for validating integrity of metadata in a standard file in accordance with an embodiment of the present invention.

DETAILED DESCRIPTION OF EMBODIMENTS

Other aspects of the invention will become apparent from the following description of the embodiments with reference to the accompanying drawings, which is set forth hereinafter.

The metadata is a descriptor for describing data, or information for managing data. The metadata includes various types of data according to usage of data. The metadata may be systemically managed using database or may be inserted into a file header. Consequently, a service is made by combining metadata of the file and metadata of the database. The metadata stored in the database can be protected by a service provider, while the metadata contained in the file can be easily forged or falsified by anyone who understands its file structure. Therefore, the permanent relationship between file data and its metadata cannot be ensured, and thus it is necessary to protect important metadata inserted into the file. To solve these problems, a steganography technology has been developed which hides metadata inside the file data. According to the steganography technology, however, an amount of data that can be hidden is limited and it takes much time to extract it. Therefore, the steganography technology has difficulty in practical applications.

To overcome the difficulty, there is a demand for a method for ensuring integrity of metadata inserted into an opened standard file format using a steganography scheme and an encryption scheme.

Figure 1:
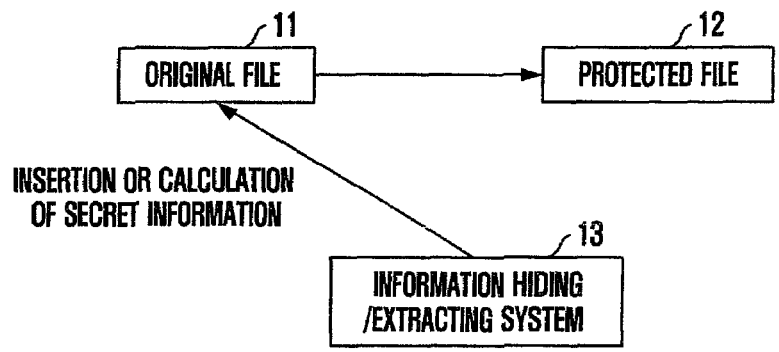
FIG. 1 illustrates a process of generating a standard file (a protected file) by inserting secret information into an original file or calculating secret information from file data (contents) according to a predetermined formula.
Figure 2:
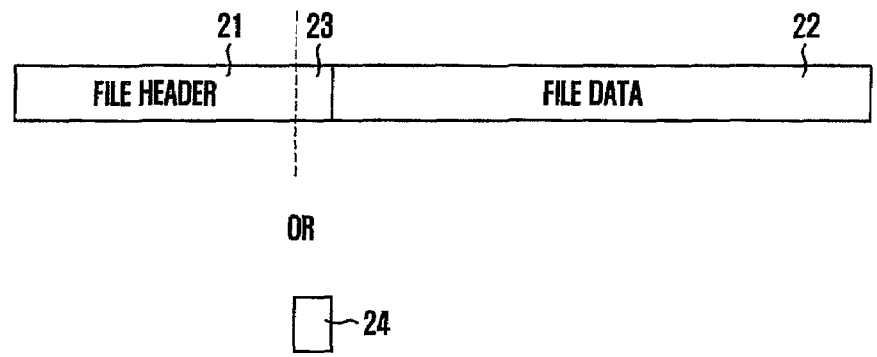
FIG. 2 illustrates a standard file (a protected file) having an integrity evidence value inserted into an original file in accordance with an embodiment of the present invention.

FIG. 1 illustrates a process of generating a standard file (a protected file) by inserting secret information into an original file or calculating secret information from file data (contents) according to a predetermined formula, and FIG. 2 illustrates a standard file (a protected file) having an integrity evidence value inserted into an original file in accordance with an embodiment of the present invention.

A file generated based on a standard file format can be arbitrarily analyzed by anyone understanding its standard. Thus, data can be read and a desired data can be inserted. This means not only the enhanced compatibility but also the security vulnerability.

To solve the security vulnerability, a steganography technology such as watermarking or fingerprinting is developed. According to this technology, secret codes are inserted into file contents so that their relationship can be kept on. In recent years, technologies robust to various attacks have been developed.

The steganography technology uses the feature of contents. For example, frequency components of image or audio are analyzed and secret information is inserted. Therefore, if encrypted contents lose features, secret information cannot be inserted into the encrypted contents by using the steganography technology. In this case, another steganography technology is applied which calculates secret information from encrypted file data or contents according to a predetermined formula.

If the secret information of the file data is exposed to malicious users, an embodiment of the present invention may become useless. Thus, the secret information to be hidden or the secret information calculated from the file data are well managed so that they cannot be exposed to malicious persons. Algorithm and mechanism for generating a protected file or extracting secret information from the protected file and their related source codes are well managed so that they cannot be exposed to general persons.

The predetermined formula may be the selection of a specific area of a file data defined by the program or the combination of several areas and may be the result value obtained by performing a cryptographic hash or polynomial operation on the selected area.

In the case of the encrypted file, audio or video features of the original contents are all lost by the encryption. Therefore, the watermarking or fingerprinting cannot be applied to the encrypted contents. In order to generate an integrity evidence value for the encrypted contents, the formula defined in the encrypted file data is applied. The formula includes the calculation of secret information using file data transform, e.g., hash, polynomial operation, substitution, and permutation.

Embodiments of the present invention is directed to ensure integrity, access control, authentication and non-repudiation with respect to metadata inserted into a file header or an optional field by using steganography technology, digital signature, or keyed hash message authentication code (HMAC) value.

A security system inserts inherent code or secret information using the steganography technology, or calculates secret information from file data or contents according to the predetermined formula. Desired metadata is inserted into the file header or optional field. The digital signature value or HMAC value is calculated using the metadata or inherent code value and is inserted into the optional field of the file or managed as separate information.

The code or secret information is extracted using the steganography technology, and the digital signature is verified or HMAC value is calculated using the code and the inserted metadata. In this way, the metadata inserted into the file can be easily verified.

One embodiment of the present invention provides a technology for integrity, access control, authentication and non-repudiation with respect to the file contents and their metadata and can be used when high security of the file contents is required.

One example of a DRM system for digital image is forgery/falsification prevention and authentication of passport photography.

When a digital passport issue system is implemented using the method according to an embodiment of the present invention, an applicant inputs his/her identity information in an application and attaches a passport photograph. At this point, integrity evidence value such as digital signature is included in the passport issue application in order to guarantee the identification of the identity information filled in the issue application and the attached passport photograph. If the secret information is not included in the passport photograph, malicious persons may use the passport photograph by stealth and make an improper use of the passport. However, when the secret information is inserted into the passport photograph or the calculated value is used as an input value for calculating the integrity evidence value by using the steganography technology according to an embodiment of the present invention, the correct integrity evidence value cannot be generated because the malicious persons do not know the secret information. That is, the passport issue application and the passport photograph file, which are physically divided, can obtain a permanent relationship by the medium of integrity evidence value, just like one file that cannot be divided. The generated integrity evidence value is HMAC code value or digital signature value having the secret information of the passport issue application and the passport photograph.

In this manner, the permanent relationship can be assigned to two physically divided files. Alternatively, the two files can be combined in one file or can be divided into more than three files. It should be noted that the number of the physical files may not be significant in certain embodiments of the present invention.

That is, the file and the file data or contents containing metadata may include two or more files. For example, several photographs may be attached to the application, or the photograph and moving pictures may be attached.

The case where an embodiment of the present invention is applied to the unencrypted contents, e.g., passport photograph, has been described. The case where an embodiment of the present invention is applied to encrypted contents will be described below.

When the passport photograph is encrypted, key management information such as content ID and access information (URL, port number, etc.) of a key management server, as well as the above-described passport issue application information, is also stored in order to decode the encrypted passport photograph. When the encrypted photograph is read, a user terminal program extracts the key management information from the file, transfers the extracted value to the server, and obtains a correct decryption key. If a malicious person alters a part of the key management information and requests a content decryption key to the server, system failure may occur due to a deny of service (DOS). In order to cope with the malicious attacks, an embodiment of the present invention assigns a permanent relationship to the encrypted passport file and the key management information and ensures the integrity. Therefore, when the information is maliciously altered, a client program verifies it and disables the trial of the request to the server. Based on this principle, a redistribution business model can be provided more stably. In the retribution business model, the encrypted contents are distributed among users in a P2P form, and a content decryption key and license are received from a lawful user. Like the encrypted passport photograph, because the key management information for obtaining the decryption key of the contents is contained in the content file downloaded in a P2P form, the malicious users may alter the information. If the information is altered, the above-described problems are caused and the service reliability is badly affected.

In addition, an embodiment of the present invention can obtain the same effect with respect to audio/video/text contents and various file format contents, as well as the DRM system for the digital image. Consequently, the drawbacks of the standard DRM can be solved.

An embodiment of the present invention includes the process of generating the protected file as shown in FIG. 1 and the process of validating the integrity of metadata as shown in FIG. 3. In the process of FIG. 1, the secret information is inserted into the original file, or the secret information is calculated from the file data or contents, based on the predetermined formula. Then, the integrity value 33 of metadata is generated. In the process of FIG. 3, when the real terminal system uses the protected file, the integrity of metadata is validated.

In the process of generating the protected file or standard file, previously assigned inherent secret information is inserted into the file data or contents, or the secret information is calculated from the file data or contents, based on the predetermined formula. Then, the metadata is inserted into the file header or optional field, and the integrity evidence value of the metadata, e.g., HMAC or digital signature value, is calculated based on the metadata and inherent code value or secret information. The calculated integrity evidence value is inserted into the optional field, or it is separately managed in the database of the server.

Through the above-described process, the protected file or standard file is generated and will be used in an apparatus for validating the integrity, which is shown in FIG. 3.

The standard file protected by inserting the code into the original file has a format of FIG. 2. The original file may be compressed using various kinds of multimedia compression technologies. The metadata or file header 21 of the protected file is identical to the original metadata. When the digital signature technology is used, the integrity evidence value 33 contains the information related to the digital signature, distinguish name (DN). The integrity evidence value may be inserted into the file, as indicated by a reference numeral 23, or may be separately managed, as indicated by a reference numeral 24.

The steganography technology may be a complicated technology such as a watermarking scheme or fingerprinting scheme, or may be a simple technology such as the selection of a specific area of the file data defined by a program or a combination of several areas, or may be the result value obtained by performing a cryptographic hash or polynomial operation on the selected area.

FIG. 3 illustrates an apparatus for validating integrity of metadata in a standard file in accordance with an embodiment of the present invention. Specifically, FIG. 3 illustrates the process of playing the protected file in which the integrity evidence value 33 of the metadata is inserted in a terminal system.

Referring to FIG. 3, the apparatus or terminal system in accordance with an embodiment of the present invention includes a metadata acquiring unit 34, an integrity evidence value acquiring unit 35, a secret information extracting unit 36, and a metadata integrity validating unit 37. The metadata acquiring unit 34 acquires metadata 31 from the protected file in order to validate the integrity of metadata before the playing of the file or the operation of a content play system 38. The integrity evidence value acquiring value 35 acquires the integrity evidence value 33 from the file or the database 39 in order to validate the integrity of the metadata before the playing of the file. The secret information extracting unit 36 extracts the secret information of the file data in order to validate the integrity of the metadata before the playing of the file. The metadata integrity validating unit 37 checks if the metadata is correct by using the acquired metadata 31, the integrity evidence value 33, and the extracted secret information.

The file header 31 includes a variety of service information for services using the file, and management information such as service access URL, content ID, key management information, and content metadata. When the digital signature technology is used, the integrity evidence value 33 includes the information related to the digital signature, distinguish name (DN).

The file data 32 is the contents of the file containing the secret information that is inserted into audio/video/text information according to a predetermined algorithm. The integrity evidence value 33 is HMAC or digital signature value obtained using the metadata and the secret information. The database 39 represents a database server for separately managing the metadata integrity evidence value 33'. The database 39 is always in the on-line state so that the terminal system can validate the integrity.

An operation of the apparatus for validating the integrity of the metadata in the standard file will be described below in detail.

In order for the terminal system to ensure the integrity of the metadata, the metadata 31 is inserted into the original file in a standard form. The secret information is inserted into the file data 32 or is calculated. The HMAC is generated using the inserted metadata and secret information. The HMAC is used as the evidence value. The evidence value may be inserted into the file and used in the verify operation, or may be stored in the database 39 and separately managed (33'). The evidence values 33 and 33' can also be obtained using the digital signature value. In this case, the signature message includes the metadata and the secret information. At this point, the distinguish name is inserted into the metadata.

It is preferable to use a public key in order for higher security, depending on technical characteristics. The use of the HMAC can secure the integrity. However, if a malicious user extracts the secret information of other user and inserts the extracted secret information, the authentication and non-repudiation will be lost. On the contrary, the use of the digital signature can obtain the permanent relationship through the hidden code and can obtain the integrity, authentication, and non-repudiation through the digital signature. Thus, the above-described problem does not occur. Consequently, the digital signature scheme is more robust than the HMAC scheme. However, compared with the HMAC scheme, the digital signature scheme is difficult to implement and there are the items to be managed. Therefore, the HMAC scheme and the digital signature scheme are appropriately selected and applied, depending on the required security degree. The generated evidence value may be inserted into the file or may be transferred to the server and stored in the database 39.

In order to validate the integrity of the metadata 31, the terminal system acquires the evidence values 33 and 33', such as HMAC or digital signature value, from the file or the database 39. Then, the terminal system extracts the secret information according to the predetermined algorithm and checks if the evidence values are correct by comparing the HMAC value or verifying the digital signature value.

Using these characteristics, the terminal system performs the access control so that only the person who provides the correct evidence value, i.e., the packaging subject of the original file can modify the metadata of the completely packaged file. In some cases, the terminal system validates the integrity of the metadata in order to consume the protected file, reads other information from the server by using the verified metadata information, and performs other operation. Thus, much time is taken in the terminal system. Therefore, in order to appropriately adjust the tradeoff between the necessary time and the security degree, an appropriate steganography technology is selected and designed depending on file formats, e.g., image, audio/video, text, etc.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application No. 2005-0088361, and No. 2006-0091932 filed in the Korean Intellectual Property Office on Sep. 22, 2005, and on Sep. 21, 2006, the entire contents of which is incorporated herein by reference.

While embodiments of the present invention has been described, it will be se skilled in the art that various changes and modifications may be made without the scope of the invention as defined in the following claims.

What is claimed is:

1. An apparatus for validating integrity of metadata in a standard file, comprising:
    a metadata acquiring unit configured to acquire metadata from a protected file, wherein the protected file comprises:
        previously generated secret information inserted into an original file, wherein the secret information is (i) calculated from data of the original file according to a predetermined formula, and (ii) inserted into the original file based on a steganography technology, in order to provide integrity, authentication, and non-repudiation for the metadata, wherein the steganography technology is at least one of: a watermarking scheme, a fingerprinting scheme and selection of one or more areas of the original file; and
        an integrity evidence value of the metadata, wherein the integrity evidence value of the metadata is generated based on the secret information using a cryptographic scheme, and includes at least one of a keyed hash message authentication code (HMAC) value and a digital signature value, in order to provide the integrity, the authentication, and the non-repudiation for the metadata, wherein the metadata is inserted into at least one of a file header and an optional field in the original file, wherein, when the digital signature value is applied, a distinguish name is inserted into the metadata;
    an integrity evidence value acquiring unit configured to acquire the integrity evidence value corresponding to the protected file from at least one of a file and a database;
    a secret information extracting unit configured to extract secret information from the protected file, using the steganography technology; and a metadata integrity validating unit configured to check if the metadata is correct by using the acquired integrity evidence value of the metadata, the acquired integrity evidence value corresponding to the protected file, and the extracted secret information of the protected file.

2. The apparatus as recited in claim 1, wherein the predetermined formula is configured to select one or more specific areas of the data of the original file, wherein the one or more specific areas are defined by a program, and generate the integrity evidence value by performing a secret information calculation, the secret information calculation comprising a transform of the data of the original file using at least one of a cryptographic hash, polynomial operation, substitution, or permutation on the one or more selected areas.

3. The apparatus as recited in claim 2, wherein the digital signature value is obtained from the metadata of a file header and secret information of the file data or contents, wherein the integrity evidence value is at least one of: added to an optional field of the metadata of the protected file and managed as separate information in the database.

4. The apparatus as recited in claim 3, wherein the digital signature value is employed as the integrity evidence value to perform non-repudiation and data access control for the protected file.

5. The apparatus as recited in claim 1, wherein the database is a database server for separately managing the metadata integrity evidence value, and maintains an on-line state in order for a terminal system to validate the integrity.

6. A method for validating integrity of metadata in a standard file, comprising the steps of:
generating a protected file from an original file by the steps of:
determining secret information from data of the original file according to a predetermined formula, and inserting the secret information into the original file based on a steganography technology, in order to provide integrity, authentication, and non-repudiation for the metadata, wherein the steganography technology is at least one of: a watermarking scheme, a fingerprinting scheme and selection of one or more areas of the original file; and
generating an integrity evidence value of the metadata and adding the integrity evidence value to at least one of: metadata of the original file and a database,
wherein the integrity evidence value is generated based on the secret information using a cryptographic scheme, and includes at least one of a keyed hash message authentication code (HMAC) value and a digital signature value, in order to provide the integrity, the authentication, and the non-repudiation for the metadata,
wherein the metadata is inserted into at least one of a file header and an optional field in the original file,
wherein, when the digital signature value is applied, a distinguish name is inserted into the metadata;
accessing the protected file by the steps of:
acquiring the metadata from the protected file when generation and consumption of the protected file are requested;
acquiring the corresponding integrity evidence value from at least one of the protected file and the database;
extracting the secret information of the protected file, using the steganography technology; and
checking if the metadata is correct based on the acquired metadata, the acquired integrity evidence value, and the extracted secret information.

7. The method as recited in claim 6, wherein the integrity evidence value is included in at least one of an optional field of the metadata of the protected file and an entry in the database, and is obtained from the metadata of a file header and the secret information.

8. The method as recited in claim 7, further comprising:
enabling non-repudiation and data access control of the protected file based on the digital signature value.

9. A method for generating a standard file, comprising the steps of:
inserting secret information into an original file based on a steganography technology, in order to provide integrity, authentication, and non-repudiation for metadata, wherein the secret information is calculated from data of the original file according to a predetermined formula, in order to provide the integrity, the authentication, and the non-repudiation for the metadata;
inserting the metadata into at least one of a file header and an optional field in the original file;
calculating an integrity evidence value of the metadata based on the metadata and the secret information; and
inserting the calculated integrity evidence value into at least one of the protected file and a separately managed database of a server,
wherein the integrity evidence value of the metadata is calculated using a cryptographic scheme and includes at least one of a keyed hash message authentication code (HMAC) value and a digital signature value, in order to provide the integrity, the authentication, and the non-repudiation for the metadata,
wherein, when the digital signature value is applied, a distinguish name is inserted into the metadata.

\* \* \* \* \*